US008717985B2

(12) United States Patent
Du et al.

(10) Patent No.: US 8,717,985 B2
(45) Date of Patent: May 6, 2014

(54) METHOD FOR GENERATING THE GROUP IDENTIFIER OF THE RANDOM ACCESS RESPONSE MESSAGE, AND A RANDOM ACCESS METHOD

(75) Inventors: Zhongda Du, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 860 days.

(21) Appl. No.: 12/934,646

(22) PCT Filed: Sep. 3, 2008

(86) PCT No.: PCT/CN2008/072258
§ 371 (c)(1),
(2), (4) Date: Oct. 28, 2010

(87) PCT Pub. No.: WO2009/117881
PCT Pub. Date: Oct. 1, 2009

(65) Prior Publication Data
US 2011/0058572 A1     Mar. 10, 2011

(30) Foreign Application Priority Data

Mar. 25, 2008 (CN) .......................... 2008 1 0087530

(51) Int. Cl.
H04W 28/04 (2009.01)
(52) U.S. Cl.
USPC ........................................................ 370/329
(58) Field of Classification Search
USPC ................................................ 370/328–329
See application file for complete search history.

(56) References Cited

U.S. PATENT DOCUMENTS

| 2007/0161377 A1* | 7/2007 | Kodikara Patabandi et al. ............................. 455/450 |
| 2007/0206531 A1 | 9/2007 | Pajukoski et al. |
| 2007/0264936 A1 | 11/2007 | Kim et al. |
| 2008/0043702 A1 | 2/2008 | Moon et al. |
| 2009/0323607 A1 | 12/2009 | Park et al. |
| 2010/0135240 A1 | 6/2010 | Kim et al. |
| 2010/0142456 A1* | 6/2010 | Lee et al. ...................... 370/329 |

FOREIGN PATENT DOCUMENTS

| CN | 101128062 A | 2/2008 |
| CN | 101128063 A | 2/2008 |
| CN | 101132618 A | 2/2008 |
| JP | 2010536284 A | 11/2010 |

(Continued)

OTHER PUBLICATIONS

Supplementary European Search Report in European application No. 08800770.3, mailed on Sep. 13, 2011.

(Continued)

*Primary Examiner* — Mark Rinehart
*Assistant Examiner* — Matthew Hopkins
(74) *Attorney, Agent, or Firm* — Oppedahl Patent Law Firm LLC

(57) ABSTRACT

The invention discloses a method for generating a group identifier of the random access response message. The group identifier is determined according to the serial number of the subframe in which the random access time slot of random access preamble message transmitted by the terminal lies and the serial number of the random access channel in which the random access time slot lies. A random access method and a random access response method in a cellular radio communication system are also provided. Using the method of the present invention, the terminal needs not acquire the absolute system time of the cellular system in which the random access time slot lies, and can access the cellular radio communication system rapidly and accurately.

14 Claims, 3 Drawing Sheets

(56) References Cited

FOREIGN PATENT DOCUMENTS

| RU | 2304348 C2 | 8/2007 |
|---|---|---|
| WO | 2007091815 A2 | 8/2007 |
| WO | 2007139188 A1 | 12/2007 |
| WO | 2008023932 A1 | 2/2008 |

OTHER PUBLICATIONS

International Search Report in international application No. PCT/CN2009/070573, mailed on May 28, 2009.
English Translation of the Written Opinion of the International Search Authority in international application No. PCT/CN2009/070573, mailed on May 28, 2009.
3GPP TSG RAN2 #59, R2-073173, Huawei, Discussion of RACH Response, Aug. 4, 2007.
Nokia Corporation, Nokia Siemens Networks, "Persistent scheduling for DL", 3GPP TSG-RAN WG2 Meeting #60bis, R2-080018, Jan. 2008.
International Search Report on international application No. PCT/CN2008/072258, mailed on Dec. 25, 2008.
English Translation of the Written Opinion of the International Search Authority in international application No. PCT/CN2008/072258, mailed on Dec. 25, 2008.
3GPP TSG RAN WG2 #60bis, R2-080555, CATT, RA-RNTI design, (7) Pages, Jan. 14, 2008.
Zte, Coding of RA-RNTI for message 2, TSG-RAN Working Group 2 meeting #59bis, R2-073933, Oct. 2007. (4 pages).
Catt, RA-RNTI design, 3GPP TSG RAN WG2 #61, R2-080718, Feb. 2008. (7 pages).
Zte, mapping between RA-RNTI and random access slot, TSG-RAN Working Group 2 meeting #61bis, R2-081622, Mar. 25, 2008. (4 pages).

\* cited by examiner

METHOD FOR GENERATING THE GROUP IDENTIFIER OF THE RANDOM ACCESS RESPONSE MESSAGE, AND A RANDOM ACCESS METHOD

TECHNICAL FIELD

The invention relates to the field of cellular radio communications, and more specifically to a method for generating a group identifier of the random access response message and a random access method.

BACKGROUND

As shown in FIG. 1, a cellular radio communication system mainly comprises terminals, base stations and a core network (CN). A radio access network (RAN) is a network formed by the base stations and responsible for the transaction of the access layer, for example, the management of the radio resources, etc. A physical or logical connection may exist among the base stations according to the actual conditions, for example, the connection between the base station 1 and the base station 2 or between the base station 1 and the base station 3 shown in FIG. 1. Each base station can be connected with one or more core network nodes. The core network is responsible for the transaction of a non-access layer, for example, the location updating, etc., and it is an anchor point of the user plane. The terminals refer to various devices for communicating with the cellular radio communication network, for example, mobile telephones or notebook computers, etc.

The cellular radio communication system takes a radio frame as the basic unit for identification of the system time, the serial number of the radio frame is known as radio frame number (SFN). The terminal can acquire the boundary of the radio frame through a cell search method, thereby achieving time synchronization on a downlink. In the cellular radio communication system such as the Long Term Evolution (LTE) system, the length of the radio frame is 10 ms (millisecond), and as shown in FIG. 2, as to the Frequency Division Duplex (FDD) mode, 10 subframes are included in one radio frame, the time length of each subframe is 1 ms, each subframe includes two time slots, and the time length of each time slot is 0.5 ms; as shown in FIG. 3, as to the Time Division Duplex (TDD) mode, generally speaking, one frame includes two half frames of which the time length is 5 ms, each half frame includes 5 subframes, the time length of each subframe is 1 ms, except for subframe #1 and subframe #6, other subframes also include two time slots, wherein the time length of the subframe and the time slot are the same with that in the FDD mode respectively; subframe #1 and subframe #6 respectively include 3 special time slots, i.e., DwPTS, GP and UpPTS. Subframe #6 can also be a normal subframe in some TDD frame formats, as shown in FIG. 4.

As to the LTE system, the length of a normal random access time slot is 1 ms, i.e., occupying the length of one subframe, and in addition, an extended random access time slot is also introduced, which may occupy the length of 2 or 3 subframes. A short random access time slot is also introduced in the TDD mode, i.e., transmitting on the UpPTS time slot.

As to the FDD mode, any subframe in time domain can be configured as a random is access time slot, but only one random access channel exists on one random access time slot. One random access channel occupies the bandwidth of 6 radio resource blocks (RB) in frequency domain. As to the TDD mode, subframe #0 and subframe #5 are always downlink time slots in time domain, therefore, subframe #0 and subframe #5 cannot be configured as random access time slots, the UpPTS time slots in subframe #1 and subframe #6 can be configured as random access time slots, whether other time slots except for the above can be configured as random access time slots is determined by the method of configuring an uplink time slot and a downlink time slot in the TDD frame structure, that the time slots configured as uplink subframes can be taken as the random access time slot. As to the TDD mode, one or more random access channels can exist on one random access time slot.

In the prior LTE system, the process of the terminal accessing into the cellular radio communication system comprises three steps as follows:

Step a, the terminal transmits a random access preamble message to the base station though a certain random access time slot of the radio frame;

Step b, the base station responds the terminal with a random access response message;

Step c, the terminal determines whether a correct response message is received according to the group identifier in the random access response message and the index of the random access preamble.

In step a, one or more terminals may transmit random access preamble messages to the base station though the same random access time slot, that these random access preamble messages may be the same with or different from each other, and the base station can identify the different random access preamble messages on the same random access time slot.

In step b, the random access response message may contain response information in response of one or more random access preamble messages. These random access preamble messages are all transmitted though the same random access time slot. Probably more than one random access response messages are merged into one response message, mainly in order to improve the utilization ratio of the radio resources in the random access process. In order to enable the terminal to identify the random access response messages, the base station adds a group identifier in the message, and there is a corresponding relationship between the group identifier and the random access time slot though which the random access preamble message is transmitted. Meanwhile, the random access response message may also contain an individual identifier corresponding to the random access preamble message itself, which is usually an index number of the random access preamble. The method for setting the group identifier is regulated in the protocol in advance, and when certain terminal transmits the random access preamble message to the base station, it has already been known what group identifier and individual identifier are to be received.

To ensure that the random access response process has certain flexibility, the random access response message is not synchronous with the random access preamble message, i.e., there is no fixed relationship between the two in time domain; on the contrary, the random access response message is allowed to be transmitted in a time window. At the same time, to increase the flexibility of the scheduling of the radio sources, to respond the random access preamble message received though certain random access time slot, the base station can transmit the random access response message corresponding to the random access preamble message on one or more Transmission Time Intervals (TTIs) in the time window. The start time of the time window is related to the speed of the base station to process the random access preamble message, and its end time is related to the load of the base station to process the random access preamble message and the radio resources scheduled to the random access response message, and other factors.

In step c, after the terminal receives one random access response message in the specified time window, firstly, the terminal verifies whether the expected group identifier is included in the message; if the expected group identifier is included in the message, the terminal then verifies whether the individual identifier (for example, index number) corresponding to the transmitted random access preamble message is also included in is the response message; if the expected individual identifier (for example, index number) is included, it can be determined that the current random access response message corresponds to the transmitted random access preamble message.

In the prior art, a method for setting the group identifier in step b is provided. Generally, in these methods a group identifier is calculated according to the absolute location of the random access time slot in the system time, therefore the group identifier is unique within the specified time range. These methods have the disadvantages that firstly, the terminal need to acquire the absolute system time of the cellular system in which the random access time slot locates, which generally refers to SFN, however, in real application, for example, the SFN of the target cellular system may be not known by the terminal in advance during the handover process, the group identifier cannot be calculated, and extra delay and system processing, for example, reading the system message, are usually needed to acquire the SFN of the target cellular system, because the SFN is usually broadcast in the system message.

SUMMARY

The technical problems that the invention aims to solve is to provide a method for generating a group identifier of the random access response message and a random access method, so that the terminal accesses into the cellular radio communication system rapidly and accurately.

To solve the problems above, the invention provides a method for generating a group identifier of the random access response message, and the group identifier is determined according to the serial number Sn of the subframe in which the random access time slot of the random access preamble message transmitted by the terminal locates and the serial number m of the random access channel in which the random access time slot locates.

Further, the group identifier may be determined according to the following formula: group identifier=$Sn+m\times10$.

Further, when the random access time slot is an extended random access time slot, the serial number Sn of the subframe in which the random access time slot locates may refer to the serial number of the subframe at the start position in a plurality of subframes occupied by the random access time slot To solve the problems above, the invention also provides a random access method for the cellular radio communication system. The terminal transmits the random access preamble message to the base station though the random access time slot and then detects the random access response message corresponding to the random access preamble message in the time window; the random access response message Includes a group identifier, the group identifier is determined according to the serial number Sn of the subframe in which the random access time slot locates and the serial number m of the random access channel in which the random access time slot locates.

Further, the group identifier may be determined according to the following formula: group identifier=$Sn+m\times10$.

Further, the terminal may read the parameter of the time window for random access in a common signaling, and the common signaling may include system messages; or the terminal may read the parameter of the time window for random access in a dedicated signaling, and the dedicated signaling may include handover command messages.

Further, when the random access time slot is an extended random access time slot, the serial number Sn of the subframe in which the random access time slot locates may refer to the serial number of the subframe at the start position in a plurality of subframes occupied by the random access time slot.

To solve the problems above, the invention also provides a random access response method for the cellular radio communication system. The base station receives the random access preamble message transmitted by the terminal though the random access time slot and then transmits the random access response message corresponding to the random access preamble message in the time window; the random access response message includes a group identifier; and the group identifier is determined according to the serial number Sn of the subframe in which the random access time slot locates and the serial number m of the random access channel in which the random access time slot locates.

Further, the group identifier may be determined according to the following formula: group identifier=$Sn+m\times10$.

Further, when the random access time slot is an extended random access time slot, the serial number Sn of the subframe in which the random access time slot locates may refer to the serial number of the subframe at the start position in a plurality of subframes occupied by the random access time slot.

By using the method of the invention, the terminal can access into the cellular radio communication system rapidly and accurately, the determining of the group identifier in the random access response message by the terminal is not depended upon the reading of the SFN, and this is especially important for the random access process during the handover process. In addition, no matter how the configuration of the random access time slot changes, the same method can be adopted for setting the group identifier, and the operation is easy for realization.

DETAILED DESCRIPTION

In the invention, the terminal transmits the random access preamble message to the base station though the random access time slot and then detects the random access response message corresponding to the random access preamble message in the time window; the corresponding random access response message includes a group identifier, and the group identifier is determined according to the serial number of the subframe in which the random access time slot locates and the serial number of the random access channel in which the random access time slot locates.

Preferably, the group identifier is determined according to the following formula:

$$\text{Group Identifier} = Sn + m \times 10.$$

Wherein, the parameter Sn refers to the serial number of the subframe in which the random access time slot locates, and the parameter m refers to the serial number of the random access channel in which the random access time slot locates.

The technical scheme of the invention will be described in detail in conjunction with the embodiments and accompanying drawings as follows.

Figure 1:
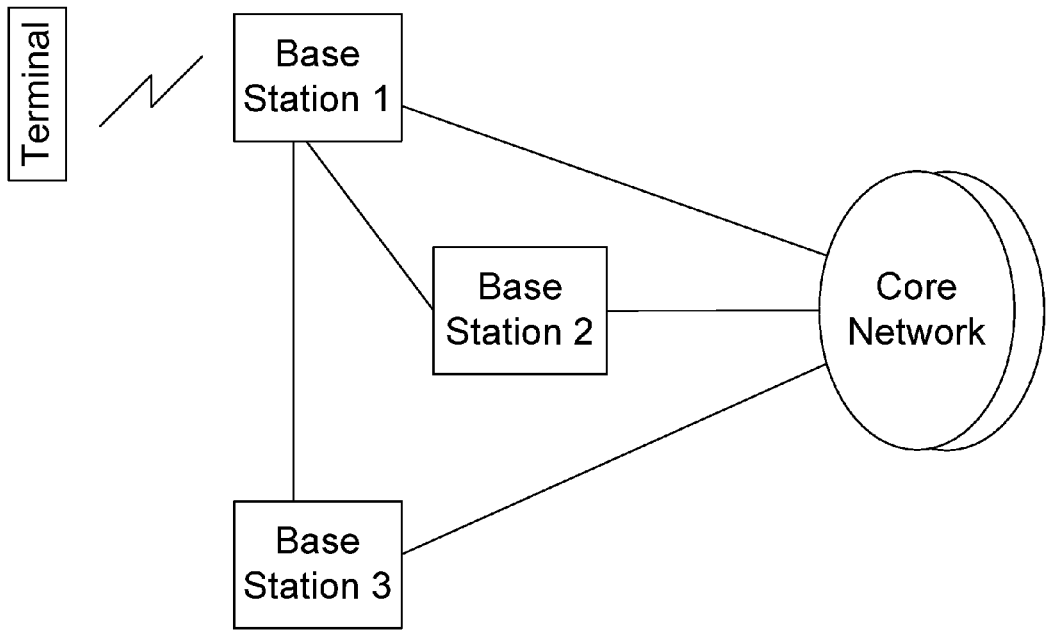
FIG. 1 is a structure diagram illustrating the cellular radio communication system in the prior art.
Figure 2:
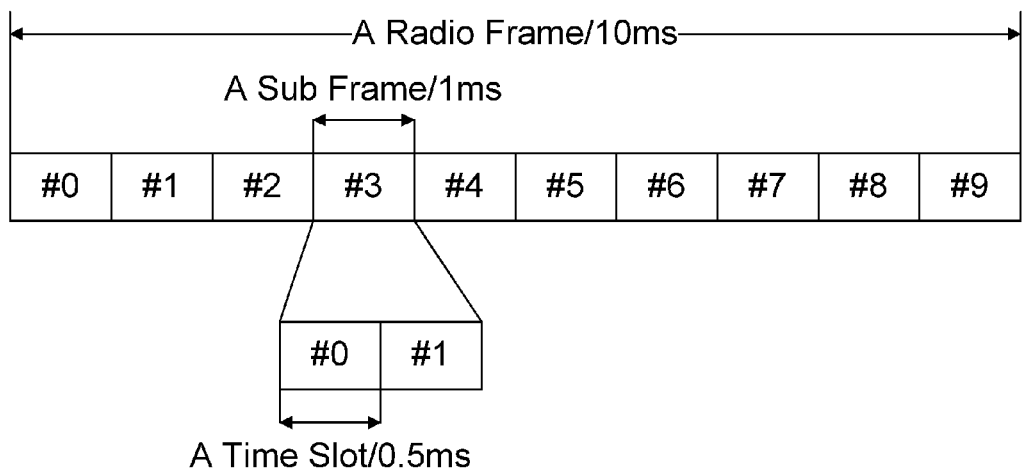
FIG. 2 illustrates the structure of a radio frame in the LTE FDD mode in the prior art.
Figure 3:
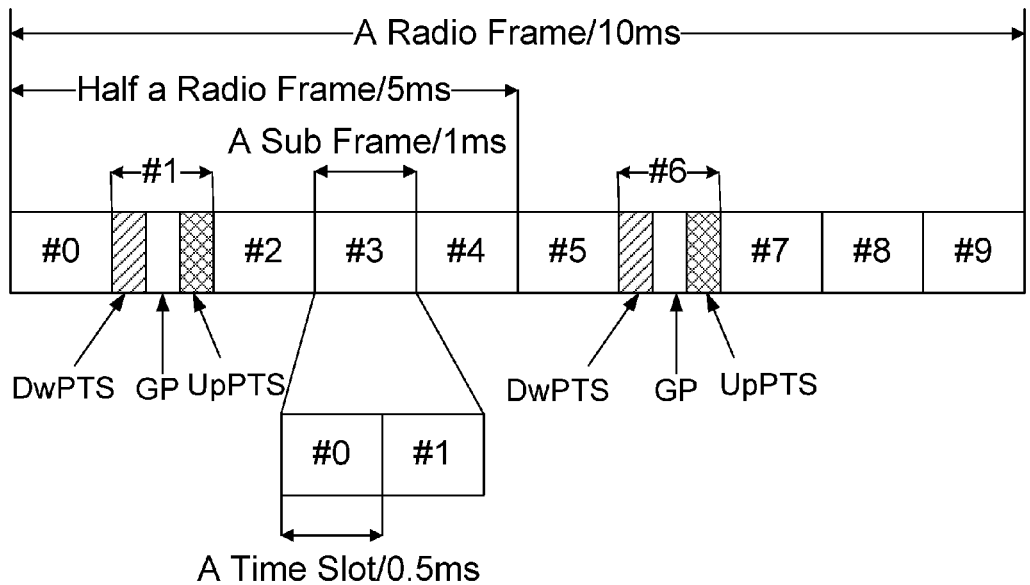
FIG. 3 illustrates the structure of a radio frame in the LTE TDD mode in the prior art.
Figure 4:
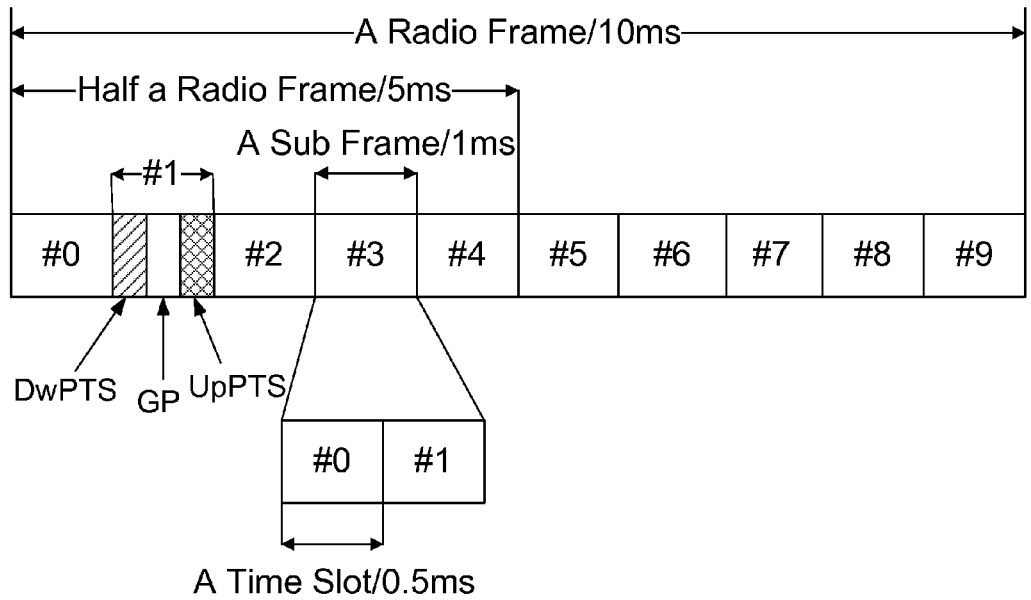
FIG. 4 illustrates the structure of another radio frame in the LTE TDD mode in the prior art.
Figure 5:
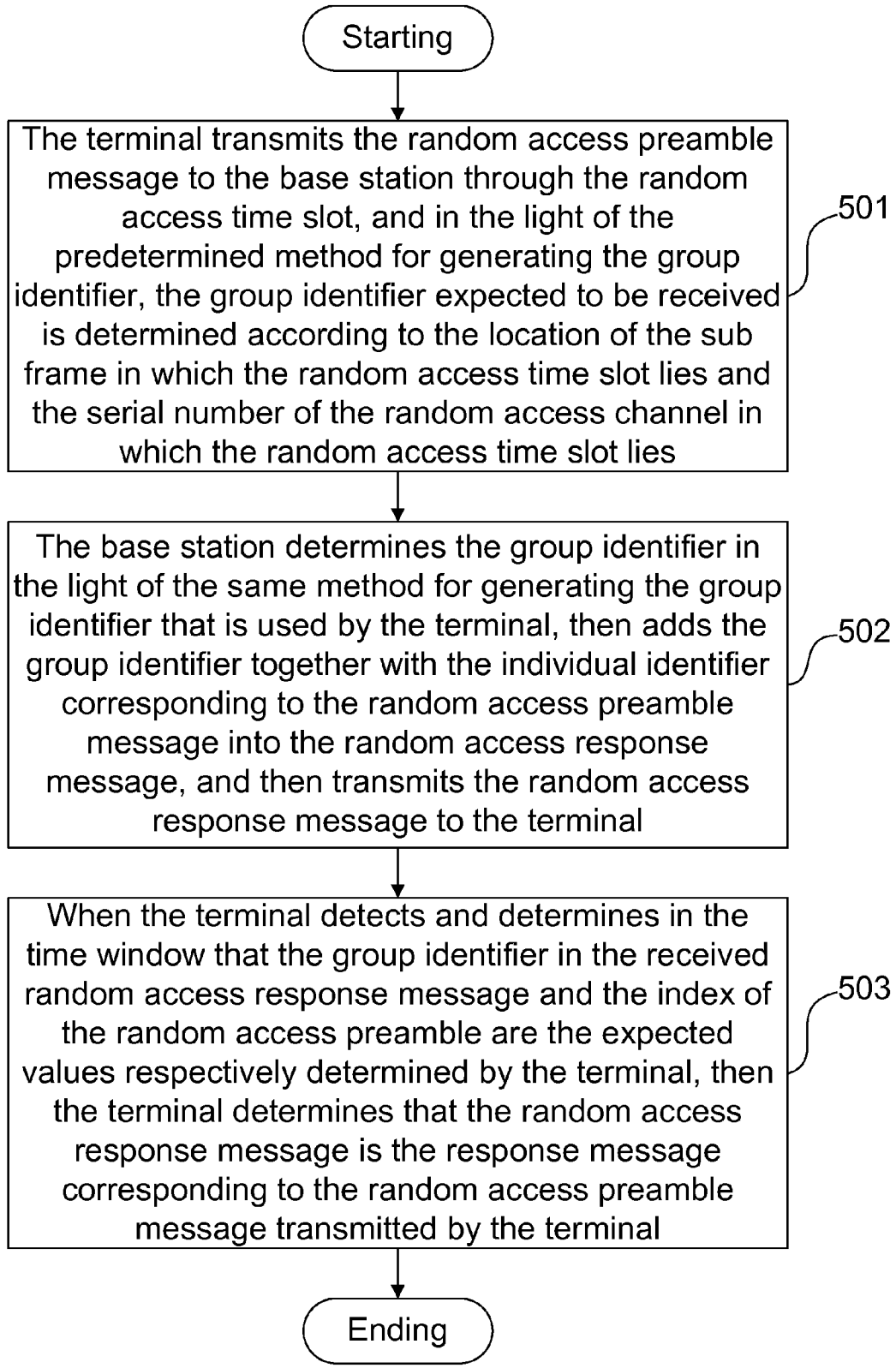
FIG. 5 is a flowchart of the random access method for the cellular radio communication system of the embodiment in the invention.

As shown in FIG. 5, the random access method for the cellular radio communication system comprises the following steps:

Step 501, the terminal transmits the random access preamble message to the base station through the random access time slot, and in the light of the predetermined method for generating the group identifier the group identifier expected to be received is determined according to the serial number of the subframe in which the random access time slot locates and the serial number of the random access channel in which the random access time slot locates;

Step 502, the base station determines the group identifier of RA-RNTI (Random Access-Radio Network Temporary Identifier) in the light of the same method for generating the group identifier that is used by the terminal, then adds the group identifier together with the individual identifier corresponding to the random access preamble message into the random access response message, and then transmits the random access response message to the terminal;

Step 503, when the terminal detects and determines in the time window that the group identifier in the received random access response message and the index of the random access preamble are the expected values respectively determined by the terminal, the terminal determines that the random access response message is the response message corresponding to the random access preamble message transmitted by the terminal.

In step 502, the random access response message also includes uplink radio resources allocated to the terminal by the base station; in step 503, after determining the receiving of the expected random access response message, the terminal transmits message or data to the base station through the uplink radio resources.

In step 503, the parameter of the time window for receiving the random access response message by the terminal can be read in a common signaling by the terminal, and the common signaling includes system messages; or be read in a dedicated signaling by the terminal, and the dedicated signaling includes handover command messages.

In step 501 or step 502, the method for generating the group identifier comprises:

The group identifier is determined according to the serial number Sn of the subframe in which the random access time slot of the random access preamble message transmitted by the terminal locates and the serial number m of the random access channel in which the random access time slot locates.

The group identifier can be directly determined according to the following formula:

$$\text{RA-RNTI} = Sn + m \times 10 \qquad (1)$$

Wherein, Sn refers to the serial number of the subframe in which the random access time slot in the radio frame locates; when the random access time slot is an extended random access time slot, Sn refers to the serial number of the subframe at the start position in a plurality of subframes occupied by the random access time slot; in the TDD mode, if the random access time slot occupies the UpPTS time slot, Sn refers to the serial number of subframe #1 and subframe #6;

m refers to the serial number of the random access channel in which the random access time slot locates. In the FDD mode, only one random access channel is configured, and m is always 0; in the TOD mode, a plurality of random access channels can be configured, and m may be greater than 0;

In addition, to determine the group identifier, a range value N can be used in conjunction with the serial number Sn of the subframe in which the random access time slot locates and the serial number m of the random access channel in which the random access time slot locates, and the range value N can be determined according to the time window parameter configured by the network and can also be a constant.

When the range value N is 10, the generation of the group identifier is determined only according to the serial number Sn of the subframe in which the random access time slot locates and the serial number m of the random access channel in which the random access time slot locates.

The RA-RNTI corresponding to the random access time slot is determined according to the following formula:

$$\text{RA-RNTI} = \text{RA-RNTI-COUNT} + Sn\%N + m \times N \qquad (2)$$

Wherein, the parameters Sn and m have been described above and thus, the detailed description thereof will be omitted herein.

The range value N can be determined according to the length of the time window for receiving the random access response message by the terminal. For example, when the length of the time window is equal to or less than 5, the range value N is 5; otherwise, the range value N is 10; the range value N can also be a constant (fixed value) such as 2, 5 or 10. The length of the time window is configured by the system, and the terminal acquires the length of the time window through a dedicated signaling (for example, handover command) or a common signaling (for example, system message).

% indicates a modulus operator, and Sn%N indicates the modulus of Sn to N, i.e., the remainder obtained by exactly dividing Sn with N.

RA-RNTI-COUNT is a constant set by the system, and the constant has the same length with the identification C-RNTI configured to the terminal by the system, i.e., the occupied bits are the same. The value of RA-RNTI-COUNT can be set to be 0.

It can be understood that when N=10, and RA-RNTI-COUNT=0, the formula (2) above is simplified as follows:

$$\text{RA-RNTI} = Sn\%10 + m \times 10 \qquad (3)$$

Since Sn is ranged from 0 to 9, Sn%10=Sn, i.e., the formula (3) is identical to the formula (1):

$$\text{RA-RNTI} = Sn + m \times 10$$

This can be further described by the following detailed embodiments:

The generation of the group identifier is determined according to the formula (1):

As to the FDD mode, the value of m is 0, then RA-RNTI=Sn; therefore the RA-RNTI corresponding to the random access preamble message transmitted on subframe #2 (i.e., Sn=2) is 2; the RA-RNTI corresponding to the random access preamble message transmitted on subframe #8 (i.e., Sn=8) is 8.

As to the TDD mode, it is assumed that 4 random access channels are configured, and the RA-RNTI corresponding to the random access preamble message transmitted on subframe #2 (i.e., Sn=2) in random access channel #0 (m=0) is 2+0*10, i.e., 2; the RA-RNTI corresponding to the random access preamble message transmitted on subframe #8 (i.e., Sn=8) in random access channel #3 (m=3) is 8+3*10, i.e., 38.

The generation of the group identifier is determined according to the formula (2):

As to the FDD mode, the value of m is 0, the received time window is assumed to be 4, then N=5, the RA-RNTI corresponding to the random access preamble message transmitted on subframe #3 (i.e., Sn=3) is RA-RNTI-COUNT+3%5, i.e., RA-RNTI-COUNT+3; the RA-RNTI corresponding to the random access preamble message transmitted on subframe #7 (i.e., Sn=7) is RA-RNTI-COUNT+7%5, i.e., RA-RNTI-COUNT+2.

As to the TDD mode, it is assumed that 3 random access channels are configured, the receiving time window is 6, N=10, and then RA-RNTI corresponding to the random access preamble message transmitted on subframe #3 (Sn=3) in random access channel #0 (m=0) is RA-RNTI-COUNT+3%10+0*10, i.e., RA-RNTI-COUNT+3; the RA-RNTI corresponding to the random access preamble message transmitted on subframe #7 (Sn=7) in random access channel #2 (m=2) is RA-RNTI-COUNT+7%10+2*10, i.e., RA-RNTI-COUNT+27.

It is assumed that the RA-RNTI-COUNT involved in the formula (2) is 0X2008 (represented in hexadecimal format).

Specific Embodiment 1

In the FDD mode, the length of the receiving time window is assumed to be 4 ms, N=5, the serial number of the subframe on which the random access preamble message was transmitted is Sn, then, RA-RNTI=0X2008+Sn%5, wherein Sn is ranged from 0 to 9.

When Sn=3, RA-RNTI=0X2008+3=0X200B
When Sn=6, RA-RNTI=0X2008+1=0X2009

Specific Embodiment 2

In the TDD mode, the length of the receiving time window is assumed to be 6 ms, N=10; the serial number of the subframe in which the time slot for transmitting the random access preamble locates is Sn, and the serial number of the random access channel in which the time slot for transmitting the random access preamble locates is m, then:

RA-RNTI=0X2008+Sn%10+m×10, wherein the range of Sn is 1, 2, 3, 4, 6, 7, 8 and 9.

When m=0, and Sn=1, RA-RNTI=0X2008+1=0X2009
When m=1, and Sn=3, RA-RNTI=0X2008+3+10=0X2015
When m=2, and Sn=6, RA-RNTI=0X2008+6+20=0X2022

In the above formulas, the operation of the hexadecimal 0X2008 being directly added to the decimal Sn%10 and m×10 aims to easily understand formula (2).

Although the invention has been described with reference to the specific embodiments, those skilled in the art should understand that various modifications and variations can be made without departing from the spirit or scope of the invention. It is intended that all these modifications and variations fall within the scope of the invention and the protection of the claims attached with the invention.

INDUSTRIAL APPLICABILITY

The invention provides a method for generating a group identifier of the random access response message and a random access method and a random access response method in a cellular radio communication system. The terminal need not acquire the absolute system time of the cellular radio communication system in which the random access time slot locates and can access into the cellular radio communication system rapidly and accurately. Furthermore, no matter how the configuration of the random access time slot changes, the same method can be adopted for setting the group identifier, and the operation is easy for realization.

What is claimed is:

1. A method for generating a group identifier of a random access response message, comprising:
    determining the group identifier according to a serial number Sn of a subframe in which a random access time slot of a random access preamble message transmitted by a terminal locates and a serial number m of a random access channel in which the random access time slot locates;
    wherein the group identifier is determined according to the following formula: group Identifier=RA-RNTI-COUNT+Sn%N+m×N, where RA-RNTI-COUNT is a constant set by a system, N is a constant which is 2, 5 or 10, or N is determined according to a length of a time window for receiving the random access response message by a terminal, and N is 5 when the length of the time window is equal to or less than 5, otherwise N is 10.

2. The method according to claim 1, wherein when RA-RNTI-COUNT is 0 and N is 10, the formula is simplified to be: group Identifier=Sn+m×10.

3. The method according to claim 2, wherein when the random access time slot is an extended random access time slot, the serial number Sn of the subframe in which the random access time slot locates refers to the serial number of the subframe at the start position in a plurality of subframes occupied by the random access time slot.

4. The method according to claim 1, wherein when the random access time slot is an extended random access time slot, the serial number Sn of the subframe in which the random access time slot locates refers to the serial number of the subframe at the start position in a plurality of subframes occupied by the random access time slot.

5. A random access method for a cellular radio communication system, comprising:
    transmitting, by a terminal, a random access preamble message to a base station through a random access time slot, and then detecting a random access response message corresponding to the random access preamble message in a time window;
    wherein, the random access response message includes a group identifier, the group identifier being determined according to a serial number Sn of a subframe in which the random access time slot locates and a serial number m of a random access response channel in which the random access time slot locates;
    wherein the group identifier is determined according to the following formula: group Identifier=RA-RNTI-COUNT+Sn%N+m×N, where RA-RNTI-COUNT is a constant set by a system, N is a constant which is 2, 5 or 10, or N is determined according to a length of a time window for receiving the random access response message by a terminal, and N is 5 when the length of the time window is equal to or less than 5, otherwise N is 10.

6. The method according to claim 5, wherein when RA-RNTI-COUNT is 0 and N is 10, the formula is simplified to be: group Identifier=Sn+m×10.

7. The method according to claim 6, wherein the terminal reads the parameter of the time window for random access in a common signaling, and the common signaling includes system messages; or the terminal reads the parameter of the time window for random access in a dedicated signaling, and the dedicated signaling includes handover command messages.

8. The method according to claim 6, wherein when the random access time slot is an extended random access time slot, the serial number Sn of the subframe in which the random access time slot locates refers to the serial number of the subframe at the start position in a plurality of subframes occupied by the random access time slot.

9. The method according to claim 5, wherein the terminal reads the parameter of the time window for random access in a common signaling, and the common signaling includes system messages; or the terminal reads the parameter of the time window for random access in a dedicated signaling, and the dedicated signaling includes handover command messages.

10. The method according to claim 5, wherein when the random access time slot is an extended random access time slot, the serial number Sn of the subframe in which the random access time slot locates refers to the serial number of the subframe at the start position in a plurality of subframes occupied by the random access time slot.

11. A random access response method for a cellular radio communication system, comprising:
   receiving, by a base station, a random access preamble message transmitted by a terminal through a random access time slot, and then transmitting a random access response message corresponding to the random access preamble message in a time window;
   wherein, the random access response message includes a group identifier, and the group identifier being determined according to a serial number Sn of a subframe in which the random access time slot locates and a serial number m of a random access channel in which the random access time slot locates;
   wherein the group identifier is determined according to the following formula: group Identifier=RA-RNTI-COUNT+Sn%N+m×N, where RA-RNTI-COUNT is a constant set by a system, N is a constant which is 2, 5 or 10, or N is determined according to a length of a time window for receiving the random access response message by a terminal, and N is 5 when the length of the time window is equal to or less than 5, otherwise N is 10.

12. The method according to claim 11, wherein when RA-RNTI-COUNT is 0 and N is 10, the formula is simplified to be: group Identifier=Sn+m×10.

13. The method according to claim 11, wherein when the random access time slot is an extended random access time slot, the serial number Sn of the subframe in which the random access time slot locates refers to the serial number of the subframe at the start position in a plurality of subframes occupied by the random access time slot.

14. The method according to claim 12, wherein when the random access time slot is an extended random access time slot, the serial number Sn of the subframe in which the random access time slot locates refers to the serial number of the subframe at the start position in a plurality of subframes occupied by the random access time slot.

* * * * *

UNITED STATES PATENT AND TRADEMARK OFFICE
CERTIFICATE OF CORRECTION

PATENT NO. : 8,717,985 B2  
APPLICATION NO. : 12/934646  
DATED : May 6, 2014  
INVENTOR(S) : Du et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this

Twenty-ninth Day of September, 2015

Michelle K. Lee  
*Director of the United States Patent and Trademark Office*